Sept. 15, 1931. W. F. KIESEL, JR 1,822,895
TRUCK FOR ROLLING STOCK
Filed June 30, 1930   3 Sheets-Sheet 3
FIG. III.
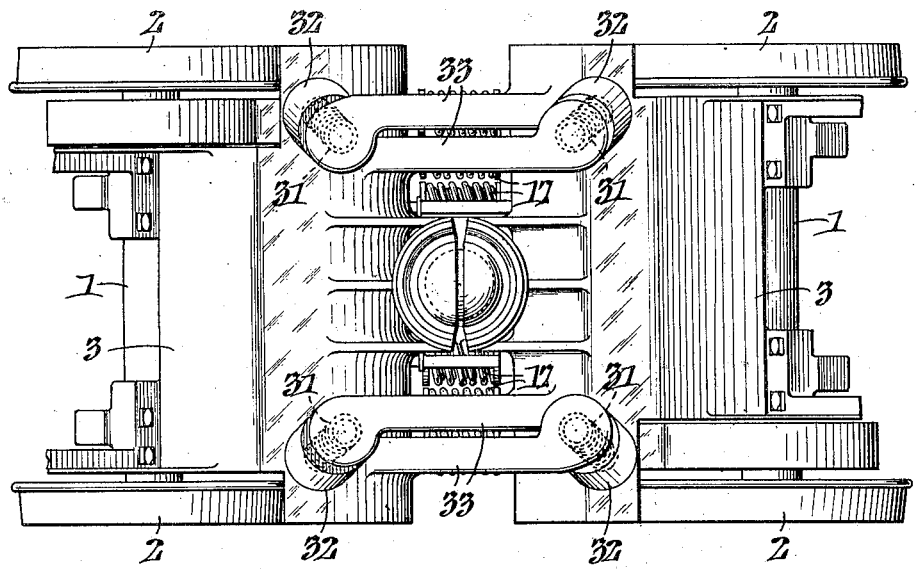
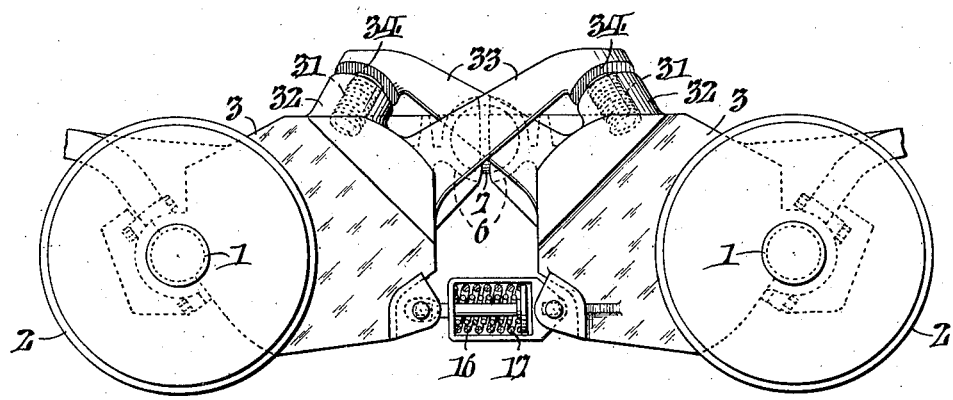
FIG. IV.
WITNESSES
INVENTOR:
William F. Kiesel Jr.,
BY
ATTORNEYS.

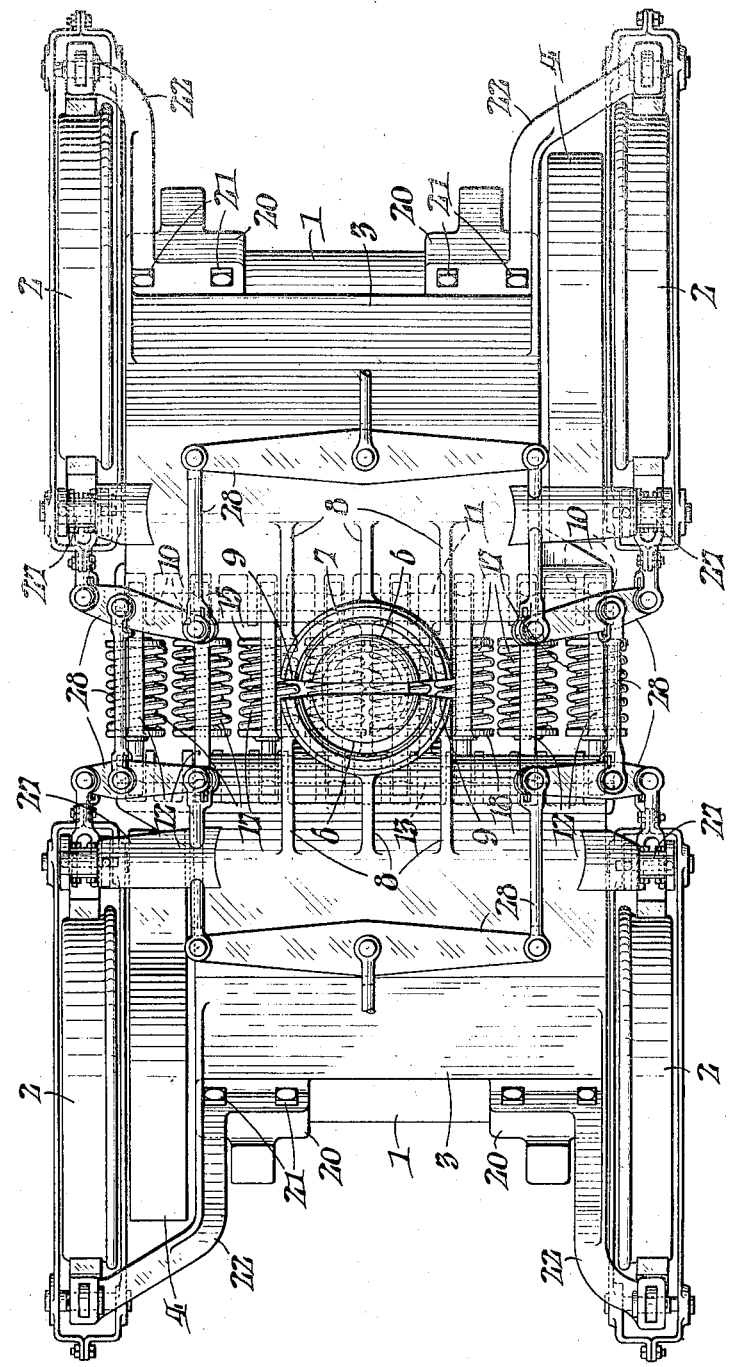

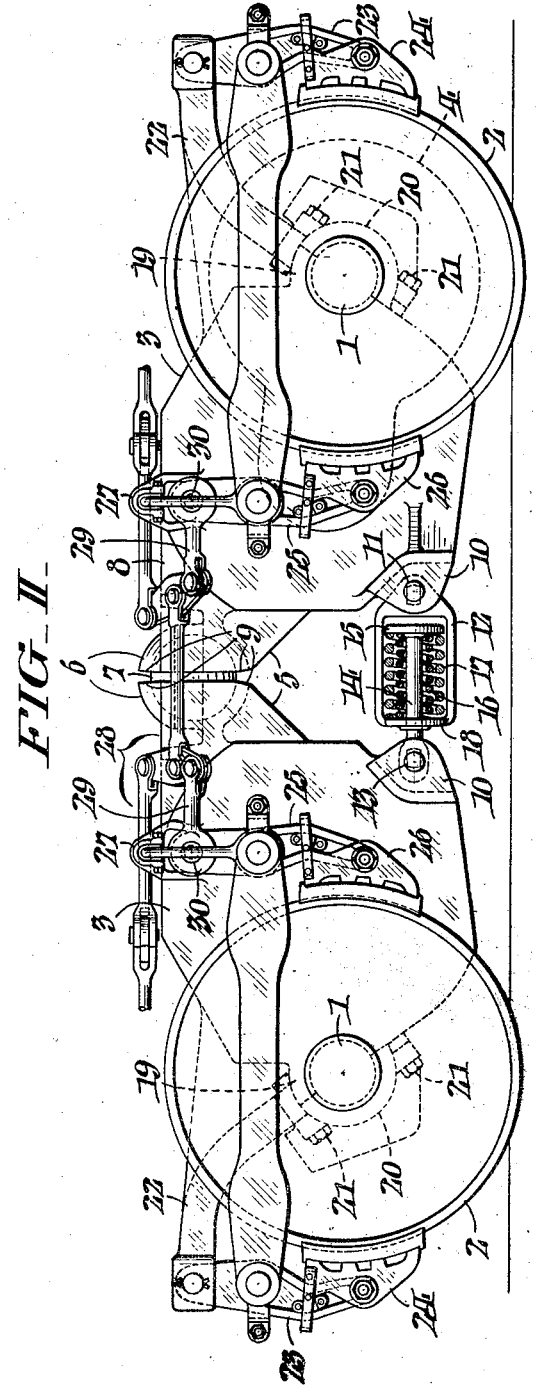

Patented Sept. 15, 1931

1,822,895

UNITED STATES PATENT OFFICE

WILLIAM F. KIESEL, JR., OF HOLLIDAYSBURG, PENNSYLVANIA

TRUCK FOR ROLLING STOCK

Application filed June 30, 1930. Serial No. 464,799.

My invention, while relating generally to trucks for railroad cars or other rolling stock, is particularly applicable to motor driven trucks, and the invention is directed to a truck characterized by the absence of the usual side frames, bolsters and transoms common to trucks in general use.

Among the disadvantages characteristic of the common forms of motor trucks now in use are those which result from the elaborate and excessively heavy frame structure employed for the support of the motor casings and the spacing of the wheel axles. With trucks having the usual side frames and bolsters, the accommodation of the various springs, the brake rigging and the means for equalizing the spring motion and maintaining the stability of the truck necessitates an undesirably long wheel base. Furthermore, with such constructions the wheel axles are held in a strictly parallel spaced relation so that, where irregularities exist in the track, there is no capacity for the truck to adapt itself to such irregularities, and, especially in the case of a truck with a long wheel base, considerable tractive effort is lost.

The object of the present invention is to provide a truck, having a minimum of weight in proportion to strength and stability, characterized by a comparatively short wheel base and the provision of means whereby the axles have capacity for relative transverse, vertical and torsional deflection to adjust themselves to curves and irregularities in the track.

Other more specific objects and advantages of the invention will become apparent from the description hereinafter of a motor truck embodying the invention and showing one form which it may take, the description having reference to the accompanying drawings, whereof:

Fig. I is a plan view of the motor truck.

Fig. II is a side elevation of the same.

Fig. III is a plan view of a modified form of truck adapted for heavy duty, the brake rigging being removed for convenience in illustration; and, Fig. IV is a side elevation of the truck of Fig. III.

With particular reference to Fig. II, the truck is shown comprising generally a pair of driving axles 1, having wheels 2 thereon, the axles being journalled in supporting members 3, which serve as casings for motors. At diagonally opposite corners of the truck there are gear casings 4, housing pinions on the motor driving shafts and larger gears on the axles meshing with the pinions, these parts, however, being concealed from view. Extending inwardly from the motor casings 3 at the top thereof are projecting members 5, preferably forming integral parts of the casings, terminating in hemispherical sockets 6 enveloping a ball 7. The sockets 6 and ball 7 provide a universal joint about which the casings 3 are independently movable, each casing having capacity for motion about a fixed front at the center of the ball 7 in three directions: to wit, transverse deflection, in which a casing swivels about the vertical axis of the ball 7, vertical deflection in which a casing swivels about the transverse horizontal axis of the ball 7, and torsional deflection in which a casing swivels about the longitudinal axis of the ball 7.

The exterior upper surfaces of the sockets 6 form a truck center plate upon which the car body center plate rests and about which the truck may revolve. While the motor truck, which is the subject of the present description, is provided with a single central bearing, upon which one end of the car body is supported, this truck is adapted for use in connection with a trailer truck at the other end of the car body having two points of support so that the two trucks together provide a three-point suspension for the car body.

It will be apparent from the description thus far that the motor casing extensions 5 terminating in the sockets 6 are purposely located at the top of the truck, the car body resting thereon, and that the sockets 6 are independently movable, their motion not disturbing, however, their function as a bearing for the car body center plate. To strengthen the sockets 6, there are provided stiffening webs 8 at the top of the motor casings 3. Furthermore, the sockets 6 are formed with their peripheral edges slightly rounded at 9 and so spaced with respect to each other as to substantially enclose the ball 7 while yet allowing for ample movement without one socket abutting upon the other.

At the bottom of each casing 3 there are shown a series of inwardly projecting lugs 10. To one set of lugs 10 are pivoted at 11 spring housings 12. To the other set of lugs 10 are pivoted at 13 plungers 14 having caps 15 accommodated within the spring housings 12. To sets of helical springs 16 and 17 are preferably interposed between the plunger caps 15 and the outer ends 18 of the housings 12, the caps 15 being threaded to engage corresponding threads on the plungers 14 so that the springs may be inserted in an obvious manner.

The springs 16, 17 serve a variety of purposes. They form a yielding connection between the two motor casings 3 tending to keep the truck square, while freely permitting, within certain limits, the relative independent motions of the motor casings heretofore described. As the ball 7 constitutes a fixed center or fulcrum about which the relative motions of the motor casings take place, the load on the center plate and the weight of the motors, casings and other appurtenances of the truck is balanced by the springs 16, 17 acting on a leverage arm comprising the distance from the center of the ball 7 to the center line of the springs. The springs thus provide a spring cushioned motion for the vertical loads of the car body; they provide a shock absorbing medium for transverse strains on the center plate, somewhat similar to the effect obtained by spring planks and links such as are commonly used on passenger car trucks of the swing motion type; and they further provide spring cushioning for torsional strains incident to the passing of the truck over track with its surface out of alignment.

The motor casings 3 at their outer ends have projecting members 19 which together with caps 20 secured thereto by bolts 21, form inside journals for the wheel axles 1. The axle bearings preferably comprise roller bearings, though plain or ball bearings may, of course, be used. Attached to the motor casings 3 at the four corners of the truck are projecting arms 22 for the support of the brake rigging.

A conventional form of brake rigging is shown merely for the purposes of illustrating how brake gear may be applied to a truck of the nature described. From the arms 22 which extend from the motor casings, the usual clog hangers 23 and brake shoes 24 are pivotally suspended. Additional clog hangers 25 and brake shoes 26 are suspended from the motor casings 3 at 27 between the axles 1. The brake shoes are applied in the customary manner through a series of operating rods and levers comprehensively designated by the numeral 28. It will be observed, however, that the pull rods 29, through which the brake pull is applied at 30, are substantially in the plane of the horizontal axis of the ball 7. Any flexure of the springs 16, 17 will, therefore, have little, if any, effect upon increasing the tension of the brake.

In Fig. III, I have shown a somewhat modified form of truck adapted for heavy duty. For cars of light or medium weight, the springs 16 and 17 are of sufficient capacity to take care of the load imposed thereon, but for heavier cars I prefer to employ additional springs 31 housed in sockets 32 at the top of the casings 3 and inclined toward the center of the truck. In the construction shown, a pair of arms extend from the top of each casing over the other casing, the arms 33 having oblique faces 34 which bear upon the ends of the springs 31, and each face 34 being perpendicular to the axis of the spring upon which it bears. The vertical load upon the truck center plate tends to uniformly compress the springs 31 which together with the springs 16 and 17 tend to keep the truck square, while yieldingly resisting deflection of one motor casing with respect to the other.

It will be apparent that the truck herein described is a frameless truck. The axles, instead of being supported in the customary manner in frames for maintaining a spaced parallel relation therebetween, are journalled in casings which are permitted within certain limits to swivel freely and with universal motion about a fixed center. Accordingly, the truck can adapt itself to curves and track irregularities which tend to elevate or depress one wheel with respect to the others. The capacity of the axles to assume a non-parallel relation enables each wheel to engage the underlying rail squarely regardless of the irregularity of the track, and, there is minimum of rolling friction between the trucks and the track. In a motor truck in which each wheel constitutes a driving element it is particularly desirable that the axles may so accommodate themselves to track irregularities in order that the traction losses may be as low as possible. It will further be apparent that the construction described permits a comparatively short wheel base with obvious resulting advantages.

While I have described in some detail one form or embodiment which this invention may take, it will be apparent, especially to those skilled in the art, that various changes may be made in the form of truck herein described and illustrated without departing from the spirit of the invention as defined in the appended claims.

Having thus described my invention, I claim:

1. A frameless truck for rolling stock including axle supporting members fulcrumed for independent torsional, transverse, and vertical movement about a fixed point.

2. A frameless truck for rolling stock including axle supporting members and a joint therebetween permitting their independent universal movement about a fixed point, said joint forming a truck center plate.

3. A frameless truck for rolling stock including axle supporting members, and inwardly projecting extensions thereon terminating in a central joint permitting independent torsional, transverse, and vertical movement of said supporting members about a fixed point.

4. A frameless truck for rolling stock including axle supporting members, and inwardly projecting extensions thereon terminating in a central joint permitting independent universal movement of said supporting members about a fixed center, said projecting extensions forming a truck center plate.

5. A frameless truck for rolling stock including motor casings and axles journalled in said casings, said casings being fulcrumed for independent torsional and transverse movement about a fixed point.

6. A frameless truck for rolling stock including motor casings and axles journalled in said casings, said casings being fulcrumed for independent universal movement about a fixed center.

7. A frameless truck for rolling stock including motor casings, axles journalled in said casings, and inwardly projecting extensions on said casings terminating in a universal joint.

8. A frameless truck for rolling stock including motor casings, axles journalled in said casings, and inwardly projecting extensions on said casings terminating in a universal joint, said projecting extensions forming a truck center plate.

9. A truck for rolling stock including axis supporting members fulcrumed for independent universal movement about a fixed point, and yielding connections between said axle supporting members tending to keep the truck square.

10. A truck for rolling stock including axle supporting members having inwardly projecting extensions fulcrumed for independent universal movement about a fixed point, and yielding connections between said axle supporting members tending to keep the truck square.

11. A truck for rolling stock including motor casings, a joint therebetween permitting independent movement of each casing about a fixed center, and spring connections between said casings and pivoted thereto for normally keeping the truck square.

12. A truck for rolling stock including motor casings, a universal joint therebetween permitting independent movement of each casing about a fixed center, and horizontal spring connections between said casings and pivoted thereto for normally keeping the truck square while allowing limited universal movement of each casing with respect to the other.

13. A truck for rolling stock including motor casings, wheel axles journalled in said casings, a ball joint disposed centrally of the wheels permitting independent movement of each casing about a fixed center, said joint serving also as a truck center plate, and yielding connections between said motor casings.

14. A frameless truck for rolling stock including axle supporting members fulcrumed for independent universal movement about a fixed point, arms extending from the top of each supporting member to the other, and springs between the ends of said arms and said supporting members.

15. A frameless truck for rolling stock including motor casings, axles journalled in said casings, a joint between said casings permitting independent relative movement about a fixed center and serving as a truck center plate, arms extending from each motor casing to the other, and springs on said casings bearing upon said arms, said springs being inclined toward the joint aforesaid.

16. A frameless truck for rolling stock including motor casings, axles journalled in said casings, a joint between said casings permitting independent relative movement about a fixed center and serving as a truck center plate, arms extending from each motor casing to the other and having oblique bearing faces, and springs on said casings bearing upon said arms, said springs having their axes inclined toward the joint aforesaid and perpendicular to the oblique faces of said arms.

17. A frameless truck for rolling stock including axle supporting members fulcrumed for independent movement about a fixed center, horizontal yielding connections between said members and below said fulcrum, arms extending from each supporting member to the other at the top thereof, and springs between the ends of said arms and said supporting members.

In testimony whereof, I have hereunto signed my name at Altoona, Pennsylvania, this 27th day of June, 1930.

WILLIAM F. KIESEL, Jr.